Patented Sept. 22, 1953

2,653,138

UNITED STATES PATENT OFFICE 2,653,138

TELLURIUM CATALYSTS

William R. Middleton, Wenonah, N. J., assignor to Socony-Vacuum Oil Company, Incorporated, a corporation of New York No Drawing. Application December 7, 1950, Serial No. 199,719

8 Claims. (Cl. 252—439)

The present invention relates to catalysts containing at least one oxide of tellurium and to their use in the catalytic conversion of methyl and methylene groups to carbonyl groups by gas containing free oxygen in the presence of finely divided catalyst comprising predominantly at least one oxide of tellurium. It is to be understood that the phrase "gas containing free oxygen" includes elemental oxygen, pure diatomic oxygen, diatomic oxygen diluted with an inert gas such as nitrogen, helium, carbon dioxide and triatomic oxygen or ozone and air.

In general, as disclosed in the copending application for United States Letters Patent Serial No. 139,529, filed January 19, 1950, in the name of Frederick P. Richter the method of converting methyl or methylene groups to carbonyl groups involves contacting the vapors of an organic substance having hydrogen atoms activated by the proximity of a double bond; i. e., alpha to an unsaturated carbon atom, or a hydroxyl group with a gas containing free oxygen in the presence of finely divided catalyst comprising predominantly at least one oxide of tellurium to obtain a compound containing a carbonyl group.

Richter, in the aforesaid copending application Serial No. 139,529, has stated that broadly illustrative of the classes of compounds which can be oxidized in this manner and the products obtained are the following equations:

(1)
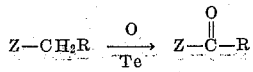

where Z is a monovalent radical having at least one center of unsaturation such as C=O; a group capable of oxidation to a carbonyl group for example a hydroxyl group; C≡C; C=C or the double bond of an aryl group directly adjacent to the methyl or methylene group and R is hydrogen or alkyl or cycloalkyl or aryl or alicyclic or heterocyclic; when R is other than hydrogen it can be substituted by any substituent which will survive under the reaction conditions, for example, a phenyl group, a halogen, a nitro group and the like.

(1)

(a) 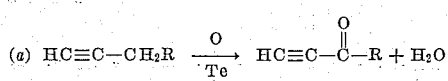

(b) 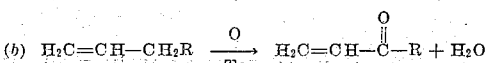

(c) 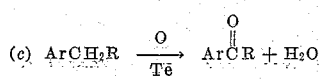

(2) 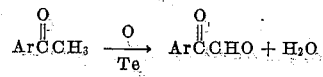

where Ar is an aryl radical substituted or unsubstituted.

(2)

(a) 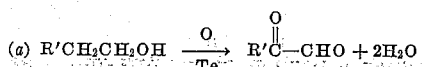

(b) 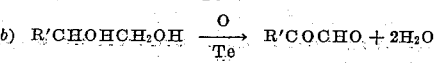

where R' is hydrogen, alkyl, cycloalkyl, aryl, heterocyclic and where other than hydrogen may be substituted by any substituent which will survive under the reaction conditions, for example, a phenyl group, a halogen, a nitro group and the like.

It will be recognized that in the foregoing Z=HC≡C—; H₂C=CH—; Ar—; ArC=O—; R'CH₂—; R'CHOH—; and R'OH—.

Compounds containing a center of unsaturation directly adjacent a methyl or methylene group such as the double bond of an aryl group as an integral part of an alicyclic ring system:

(3)

(a) 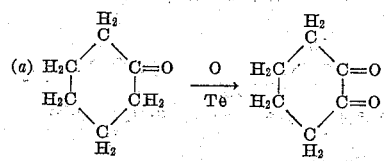

(b) 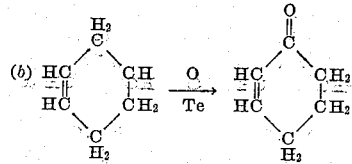

(c) 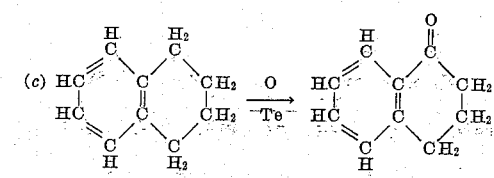

It is to be noted that

has been used in the foregoing equations to indicate a reaction taking place in the presence of a gas containing free oxygen as defined hereinbefore and a finely divided catalyst comprising predominantly at least one oxide of tellurium.

The manner in which the finely divided catalyst comprising at least one oxide of tellurium is used apparently is unimportant. For example, it can be used as a finely divided, unsupported catalyst, or as a finely divided catalyst on an inert support or an "active" support. It is to be noted that an "active" support is one which, in the absence of catalyst comprising predominantly at least one oxide of tellurium but in the presence of a gas containing free oxygen, accelerates the oxidation of organic substances of the class described hereinbefore usually to produce oxidation products other than those of the carbonyl type illustrated hereinbefore. An organic carbonyl group is a group which exists in that state of oxidation which is intermediate between a primary or secondary alcohol and a carboxylic acid. An inert support is one which in the absence of catalyst comprising predominantly at least one oxide of tellurium but in the presence of a gas containing free oxygen does not accelerate to any appreciable extent the oxidation of organic substances of the class described hereinbefore to produce oxidation products.

The present invention provides an improvement of the invention described and defined in the copending application Serial No. 139,529, from which a portion of the foregoing has been taken. Accordingly, the improved catalyst and the improved method described hereinafter is coextensive in scope with that of application Serial No. 139,529. That is to say, the improved catalyst is useful in the oxidation of propylene to acrolein, in the oxidation of a mixture of refinery gases such as a propylene-propane fraction, in the oxidation of isobutylene to methacrolein, and in the oxidation of toulene to benzaldehyde as described in the copending application Serial No. 139,529.

While the unpromoted catalysts comprising predominantly at least one oxide of tellurium can be supported or unsupported, and the unpromoted catalyst can be prepared by mechanical sub-division of the metal, technical difficulties are encountered when an attempt is made to prepare the promoted catalysts by mechanical sub-division. Therefore, it is preferred to prepare the promoted catalysts containing at least one oxide of tellurium and a critical minimum concentration of a promoter oxide by methods other than mechanical sub-division.

There is evidence that the tellurium catalyst is a labile system of metallic tellurium and at least one oxide of tellurium but evidence is lacking regarding how the promoter affects this system.

It is preferred to employ a supported catalyst, i. e., to distribute the promoted catalyst over a supporting material which may be of the inert type or of the "active" type. Inert supports are those such as "fused" alumina which per se do not accelerate oxidation reactions. "Active" supports are those which, like silica gel, per se accelerate the oxidation of olefins to $CO$, $CO_2$, and $H_2O$.

While the catalyst and method disclosed in copending application Serial No. 139,529 have provided satisfactory results in the oxidation of methyl or methylene groups to carbonyl groups, it has been found that even these satisfactory results can be improved. For example, when using a supported catalyst such as described in Serial No. 139,529 having the inert fused alumina support, very low space velocities, such as 0.3 to 0.5, were necessary to obtain the best conversions of 5 to 8%. Higher space velocities lead to a sharp reduction in the conversion when the catalyst is the unpromoted catalyst of application Serial No. 139,529. On the other hand, when supported catalysts having "active" supports such as silica gel were used, other difficulties were encountered. Due to the deposition of "coke" on these "active" support catalysts, periodic burning of the coke deposit was necessary to remove the deposit and restore the activity of the catalyst. In addition, with the catalysts having "active" supports "hot-spots," i. e., areas of excessive temperature, formed in the catalyst bed and excessive oxidation to the end products of combustion occurred. These difficulties resulted in much lower ultimate conversions to carbonyl products when using unpromoted catalysts having "active" supports compared with the ultimate conversions employing inert supports. The ultimate conversions with catalysts having active supports in some instances were only about 36 to about 66% of those obtained with catalysts having inert supports. However, with catalysts having active supports the conversion per pass was greater under favorable conditions and space velocities could be increased from 0.3 to 0.5 to 1.0 to 2.0 without excessive drop in conversion per pass.

It has now been discovered that the addition of about 1 to about 40 mole per cent, preferably about 5 to about 35 mole per cent of a metal oxide of a metal of group VI of the periodic table having an atomic weight of at least about 96, permits the use of higher space velocities at equal or greater conversions per pass without substantial loss in ultimate conversion or yield.

It is to be noted that catalysts which at least theoretically contain the promoter as a tellurate are not equivalent to the promoted catalysts of the present invention wherein the promoter as well as the tellurium is present predominantly as at least one oxide. The foregoing is manifest from the following facts.

Two tellurium catalysts were prepared containing the equivalent of 25 mole per cent uranium oxide. In catalyst A the mixed oxides were prepared by steam hydrolysis of the mixed oxychlorides. In catalyst B the uranium was incorporated as uranyl tellurate in three moles of excess telluric acid. The excess telluric acid was dehydrated and reduced readily under catalyst operating conditions to tellurium oxide. The two catalysts A and B were evaluated at 752°–754° F. for the conversion of propylene to acrolein using a molar air-to-propylene ratio of 3.0 and a gas space velocity of 4.0–4.2 with each catalyst. The conversion of propylene to acrolein with catalyst A containing the promoter as an oxide was 9.7% while the conversion of propylene to acrolein with catalyst B wherein the promoter was not present as an oxide was only 4.9%, i. e., of the order obtained with the unpromoted catalysts described in the copending application Serial No. 139,529. Thus, it is manifest that the novel promoted or mixed catalysts contain about 1 to about 40 mole per cent, preferably about 5 to about 35 mole per cent based upon the tellurium of a metal of group VI having an atomic weight of at least about 96, said metal being in the form of at least one oxide and not as a compound of tellurium. Accordingly, the novel catalysts are supported or unsupported mixtures predominantly of about 1 to about 40 mole per cent, preferably about 5 to about 35 mole per cent based upon the tellurium of at least one oxide of a metal of group VI having an atomic weight of at least about 96, i. e., molybdenum, tungsten and uranium and the balance predominantly at least one oxide of tellurium.

The supported catalysts can have as supports either an inert material or an active material as defined hereinbefore and in copending application Serial No. 139,529.

It is preferred to prepare the supported catalysts in the following ways:

PROCEDURE A

A supporting material, either of the inert type or of the active type, i. e., say "fused" alumina or silica gel, is saturated with a concentrated aqueous solution of telluric acid and the amount of a suitable promoter precursor sufficient to give between about 1 and about 40, preferably between about 5 and about 35 mole per cent of the promoter oxide based upon the tellurium. The promoter precursor is a compound of the promoter metal containing no other metallic component and capable of being converted to the oxide if not then in the form of the oxide. For example, 85% molybdic acid, uranyl nitrate or acetate, and tungsten chloride can be used. Thus, when preparing a molybdenum promoted catalyst, that amount of 85% molybdic acid necessary to yield about 5 to about 40 mole per cent molybdic oxide is dissolved in an aqueous solution of telluric acid and the support saturated with the telluric acid solution.

PROCEDURE B

A solution of tellurium dioxide and, say, an amount of uranyl nitrate sufficient to yield uranium oxide equivalent to about 5 to about 40 mole per cent of the tellurium dioxide, is prepared in concentrated (38-39%) hydrochloric acid. The solution so obtained is adjusted by dilution or evaporation, as necessary, to just saturate the pores of the support to which it is to be applied. Upon drying the saturated support, an oxychloride coating is obtained upon the support. The coated support is then placed in a suitable container and the oxychloride coating hydrolyzed with steam at about 420-675° F. for a suitable period of up to about 30 hours. Hydrolysis to the oxide form is complete when the steam condensate no longer gives a positive test for the chloride ion. Thereafter residual steam is flushed from the catalyst with dry air or oxygen and the catalyst is ready for use.

The preferred support for the promoted or mixed catalysts described herein is 8-14 mesh inert, fused alumina known as tabular alumina. This inert alumina exhibits a porosity in the range of about 15 to about 25% and a surface area in the range of about 3-5 square meters per gram. In the illustrative but not limiting examples given hereinafter, the concentration of tellurium oxide (as $TeO_2$) upon the tabular alumina was either about 10 or about 15 grams per 100 cubic centimeters of the alumina support. However, no significant difference was noted, in performance of these catalysts which could be attributed to the variation in the concentration of tellurium oxide on the support.

It is to be noted that specific, selective partial oxidation of the compounds discussed hereinbefore in the presence of these tellurium catalysts produces a moderate amount of heat whereas complete unselective oxidation of an appreciable percentage of the compound charged to the catalyst zone is accompanied by the evolution of an excessive amount of heat. In other words, when these compounds are oxidized to carbonyl compounds, the reaction produces a moderate amount of heat in the catalyst zone which is readily dissipated and controlled. In general, in the operation of tellurium catalysts which are highly selective in their action, there is a rise of less than about one degree Fahrenheit for each mole per cent of compound converted to the carbonyl. In contrast, tellurium catalysts which are low in selectivity, i. e., performing complete as well as partial oxidations, are subject under similar conditions to temperature rises in the catalyst bed of 5°-10° F. per mole per cent of compound converted to carbonyl.

In the following illustrative but not limiting examples of the improved method for converting methyl and methylene groups activated by the proximity of a center of unsaturation, or a carbonyl group, to a carbonyl group with a gas containing free oxygen in the presence of a catalyst comprising about 5-35 mole per cent of an oxide of a metal of group VI having a molecular weight of at least about 96 and the balance predominantly at least one oxide of tellurium, reference is made to the maximum observed temperature rise in the catalyst due to the oxidation reactions which is indicative of the degree of selectivity exhibited by the catalyst.

*Example I*

A gaseous mixture of propylene and air in the proportion of one volume of propylene to 3 volumes of air was passed at essentially atmospheric pressure through one volume of catalyst at the rate of 4 volumes of the gaseous mixture per minute or at a space velocity of 4 equivalent to a propylene space velocity of 1. The temperature of the reaction zone was maintained at about 750°-754° F. The maximum observed temperature rise in the catalyst due to oxidation was 4° F. The catalyst was prepared in accordance with Procedure B given hereinbefore and contained 0.05 mole of $UO_3$ based upon the tellurium.

The product was absorbed in water at a temperature below 50° F. Analysis of the aqueous solution indicated that about 4.5 per cent of the propylene was converted to acrolein.

Under the same conditions, a tellurium catalyst such as described in copending application Serial No. 139,529 gave a conversion of only about 1.8 per cent of the propylene to acrolein.

*Example II*

A gaseous mixture of propylene and air in the proportion of one volume of propylene to two volumes of air was passed at essentially atmospheric pressure through one volume of catalyst at the rate of three volumes of the gaseous mixture per minute or at a space velocity of 3 equivalent to a propylene space velocity of 1. The maximum observed temperature rise in the catalyst due to the oxidation reaction was 14° F. and the temperature of the reaction zone was maintained at about 742°-756° F. The catalyst was prepared in accordance with Procedure B given hereinbefore and the catalyst contained 0.25 mole of $UO_3$ per mole of tellurium oxide or 25 mole per cent of $UO_3$ based on the tellurium oxide.

Analysis of the aqueous solution obtained by absorption of the product in water at a temperature below about 50° F. indicated that about 15.2 per cent of the propylene was converted to acrolein. An independent analysis of the total gases from the reaction zone by means of a mass spectrometer indicated that about 20.0 per cent of the propylene was converted to acrolein and about 5.2 per cent was converted to carbon monoxide and carbon dioxide.

Under the same conditions, a catalyst containing an equivalent amount of tellurium oxide gave a conversion of only about 1.4 per cent of the propylene to acrolein with a 1° F. rise in temperature in the catalyst bed due to the heat of oxidation.

*Example III*

The catalyst used in Example II was also used in this example. A gaseous mixture of one volume of propylene and three volumes of air was passed at essentially atmospheric pressure through one volume of catalyst at the rate of about four volumes of gaseous mixture per minute. This is a space velocity of four or a propylene space velocity of 1. The temperature of the reaction zone was maintained at about 757°–767° F. The maximum observed temperature rise due to the reaction was about 10° F. The contact time was calculated to be about 6.6 seconds.

Analysis of the total gases from the reactor zone by means of the mass spectrometer indicated that about 18.2 per cent of the propylene was converted to acrolein while only about 1.0 per cent of the propylene was converted to carbon dioxide. No carbon monoxide was detected in the gases.

Under the same conditions, except for a slightly lower catalyst temperature (751°–753° F.), a similar catalyst containing no promoter gave a conversion of only 1.8 per cent of the propylene to acrolein.

*Example IV*

A catalyst was prepared in accordance with Procedure A given hereinbefore with an additional step due to the insolubility of the tungsten oxide. Before the application of the aqueous telluric acid, the required amount of tungsten oxide ($WO_3$), equivalent to 5 mole percent of the tellurium oxide, in the form of ammonium tungstate [$(NH_4)_2WO_4$] was applied to the tabular alumina.

Using the foregoing catalyst, a gaseous mixture of one volume of propylene and three volumes of air was passed at essentially atmospheric pressure through one volume of catalyst at the rate of four volumes of gaseous mixture per minute or a space velocity of four equivalent to a propylene space velocity of one. The temperature of the reaction zone was maintained at about 743°–752° F. The maximum temperature rise due to the reaction was observed to be about 9° F.

The product was absorbed in water at a temperature below 50° F. Analysis of the aqueous solution indicated that about 8.8 per cent of the propylene was converted to acrolein.

Under the same conditions, an unpromoted tellurium catalyst gave a conversion of about 2.1 per cent of the propylene to acrolein with a maximum rise in the temperature of the catalyst bed due to the reaction of only 2° F.

*Example V*

A gaseous mixture of propylene and air in the proportion of one volume of propylene to three volumes of air was passed at essentially atmospheric pressure through one volume of catalyst at the rate of four volumes of the gaseous mixture per minute or a space velocity of four and a propylene space velocity of one.

The temperature of the reaction zone was maintained at about 755°–767° F. and the maximum observed rise in temperature of the catalyst due to the reaction was about 12° F.

The catalyst was prepared by Procedure B given hereinbefore and contained 0.05 mole of $MoO_3$ per mole of tellurium oxide, i. e., a molybdenum oxide concentration of 5 mole per cent.

The product was absorbed in water at a temperature below about 50° F. Analysis of the aqueous solution so obtained indicated that about 18.7 per cent of the propylene was converted to acrolein.

*Example VI*

A gaseous mixture of propylene and air in the proportion of one volume of propylene to two volumes of air was passed at essentially atmospheric pressure through one volume of catalyst at the rate of three volumes of gaseous mixture per minute, a space velocity of three or a propylene space velocity of one.

The temperature of the reaction zone was maintained at about 694°–703° F. The maximum observed temperature rise in the catalyst bed due to the reaction was about 9° F.

The catalyst was prepared in accordance with Procedure A given hereinbefore and contained 0.10 mole of $MoO_3$ per mole of tellurium oxide or the concentration of $MoO_3$ was 10 mole per cent.

The product was absorbed in water at a temperature below about 50° F. Analysis of the aqueous solution so obtained indicated that about 13.4 per cent of the propylene was converted to acrolein.

The preferred range of concentration of molybdenum in the novel promoted catalysts is about 5 to about 10 mole per cent and for uranium is about 25 to about 35 mole per cent.

The temperature range for the reaction is from about 600° to about 900° F. with the range 700° to 800° F. being preferred.

In a similar manner, toluene mixed with air in the ratio of about one volume of toluene vapor to about three volumes of air can be passed through four volumes of a catalyst at a velocity of about four volumes of the gaseous mixture per minute and the benzaldehyde recovered by fraction condensation or distillation of the effluent vapors from the reactor. It is to be noted that lower per pass conversions are concomitant with higher space velocities.

The organic substance to oxidizing gas ratio can be varied over a wide range although it is preferred to use ratios of about 1:1 to about 1:9.

Broadly defined, the substances which can be oxidized with air or other gas containing free oxygen in the presence of non-stoichiometric quantities of finely divided catalyst comprising predominantly at least one oxide of tellurium, are those having hydrogen atoms attached to a carbon atom alpha to an unsaturated carbon atom such as in olefins of three or more carbon atoms; isolated diolefins; i. e., diolefins in which there is at least one methylene or substituted methylene group between the olefinic carbons; acetylenic hydrocarbons having at least three carbon atoms; conjugated diolefins of more than four carbon atoms; cycloolefins, for example, cyclopentadiene; aromatic hydrocarbons, such as xylene, methyl, naphthalenes, methyl anthracenes and the like; or alpha to a hydroxyl group, such as ethanol, propanol, pentanol, isopentanol, octanol, octadecanol, octadecenol, ethandiol, propandiol, butylene glycol, pentylene glycol, octandiol; and in general hydrocarbons, substituted hydrocarbons and primary and secondary alcohols of up to 22 carbon atoms. For example, paraffin wax (18–24 carbon atoms) can be halogenated, dehydrohalogenated to the olefinic form and then oxidized.

Thus, for example, substituted butadiene derivatives conforming to the general formula,

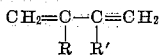

wherein R and R' are alkyl or aryl groups substituted or unsubstituted can be oxidized in the manner described hereinbefore and converted to the corresponding carbonyl compounds.

Thus, for example, 1,3,-butadiene, 1,3-pentadiene (alpha-methylbutadiene) 1,4-pentadiene, 2-methyl-1,3-butadiene (isoprene), 1,5-hexadiene (diallyl), 2-methyl-1,4-pentadiene (isodiallyl), 2,3 - dimethyl - 1,3 - butadiene (diisopropenyl), 3 - methyl - 1,3 - hexadiene, 3 - methyl - 2,4-hexadiene, 2,7 - heptadiene, 4 - methyl - 1,6 - heptadiene, 2,5 - dimethyl - 2,4 - hexadiene, 3 - methyl-1,5-octadiene, 1,4-nonadiene, 3,7-decadiene can be oxidized with air in the presence of finely divided catalyst comprising predominantly at least one oxide of tellurium at temperatures of about 350° to about 550° C. or generally at temperatures at which the diolefin is gaseous but below the cracking temperature of the diolefin, to the corresponding carbonyl compounds.

Illustrative of another group of hydrocarbons which can be oxidized to the corresponding carbonyl compounds in gaseous phase with pure or diluted gaseous oxygen in the presence of the "tellurium" catalyst at temperatures at which the hydrocarbon is gaseous but below the cracking temperature of the hydrocarbon are the following members of the acetylene series: 2-butyne, 2-pentyne, 2-hexyne, 3-hexyne, 4-methyl-2-pentyne, 3-heptyne, 5-methyl-2-hexyne, 4,4-dimethyl-2-pentyne, 5-methyl-5-ethyl-3-heptyne, 2-undecyne, 6-dodecyne, 2-hexadecyne, 9-octadecyne.

Illustrative of the aromatic hydrocarbons which can be oxidized to the corresponding carbonyl compounds by air in the presence of the "tellurium" catalyst at temperatures between the normal boiling point of the hydrocarbon and the cracking temperature thereof are trimethylbenzene, o-ethyltoluene (1-methyl-2-ethylbenzene) 1-methyl-2-propylbenzene, 1,3-dimethyl-4-ethylbenzene, tetra-methylbenzene, 1-methyl-4-isobutylbenzene, 1,2-dimethyl-4-propylbenzene, 1,2,4-trimethyl-5-ethylbenzene, 1-methyl-3-amylbenzene, 1,3-dimethyl-4,6-diethylbenzene, 1-methyl-2-propyl-4-isopropylbenzene, 1,3,5-trimethyl-2,4-diethylbenzene, alpha and beta styrene, 1-phenyl-1,3-butadiene, 1-methyl-4-propenylbenzene, 1-phenyl-2-pentene, dimethyl naphthalene, dimethanthracene, dimethylphenanthrene, and the like.

Illustrative of the cyclo-olefins which can be oxidized to the corresponding carbonyl compounds by air in the presence of the "tellurium" catalyst at temperatures between the boiling point and the cracking temperature of the cycloolefin are 1-methyl-1-cyclobutene, 1-methyl-1-cyclopentene, 1-2-dimethyl-1-cyclopentene, 1-methyl-2-ethyl-1-cyclopentene, 1-methyl-2-propyl-1-cyclopentene, 1,2-dimethyl-1-cyclohexene, and 1-ethyl-3-methyl-1-cyclohexene.

Illustrative of the organic compounds, having a methyl or methylene group activated by the presence of a hydroxyl group, which can be oxidized to the corresponding carbonyl compounds by gaseous oxygen (pure or diluted), ozone and air in the presence of the "tellurium" catalyst at temperatures between the boiling point of the compound and the temperature at which said compound cracks or decomposes are the following: glycol, propandiol-1,2; propandiol-1,3; 1,2-dihydroxybutane, 1,4-dihydroxybutane, 2,3-dihydroxyhexane and the like. Monohydroxy compounds such as the aliphatic alcohols, ethanol, butanol, propanol, hexanol, octanol and the like can also be oxidized to the corresponding carbonyl compounds by gaseous oxygen in the presence of the "tellurium" catalyst at temperatures between the boiling point of the alcohol and the temperature at which the alcohol decomposes.

A characteristic of the catalyst disclosed hereinbefore is its capacity to promote the oxidation of methyl or methylene groups directly adjacent to a center of unsaturation in an organic compound such as, for example, the unsaturation found in aromatic compounds, olefins or carbonyl groups. A further distinguishing feature is the fact that although the catalyst catalyzes the oxidation of such methyl and methylene groups to carbonyl groups, $=C=O$ or

it does not catalyze the oxidation of carbonyl groups to higher states of oxidation. Thus, it is specific for the following transformations:

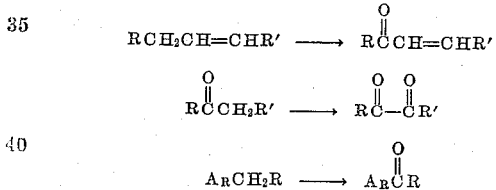

Compounds intermediate between the above reactants and the products in oxidation state such as, for example, benzyl alcohol, allyl alcohol and the like also can be oxidized using the technique disclosed hereinbefore. Ethylene can be oxidized to glyoxal and anthracene to anthraquinone as can organic substances which form in situ reactants such as those the oxidation of which has been discussed herein or their intermediate oxidation products through dehydrogenation, dehydration, rearrangement, dehalogenation, dehydrohalogenation and similar reactions, for instance, methyl cyclohexadiene, tertiary butanol, beta-pinene, 2,3-diiodopropane and alpha-bromodiethylketone.

I claim:

1. A new catalyst consisting essentially of about 1 to about 40 mole per cent of an oxide of a metal of group VI of the periodic table having an atomic weight of at least about 96 and an oxide of tellurium.

2. A new catalyst consisting essentially of about 5 to about 35 mole per cent of an oxide of a metal of group VI of the periodic table having an atomic weight of at least about 96 and an oxide of tellurium.

3. A new catalyst consisting essentially of about 5 to about 10 mole per cent molybdenum oxide and an oxide of tellurium.

4. A new catalyst consisting essentially of about 25 to about 35 mole per cent of uranium oxide and an oxide of tellurium.

5. The catalyst described and set forth in claim 3, wherein the catalyst is deposited on a silica gel support.

6. The catalyst described and set forth in claim 3, wherein the catalyst is deposited on a fused alumina support.

7. The catalyst described and set forth in claim 4, wherein the catalyst is deposited on a silica gel support.

8. The catalyst described and set forth in claim 4, wherein the catalyst is deposited on a fused alumina support.

WILLIAM R. MIDDLETON.

References Cited in the file of this patent

UNITED STATES PATENTS

| Number | Name | Date |
|---|---|---|
| 1,103,017 | Ellis | July 7, 1914 |
| 2,161,066 | La Lande | June 6, 1939 |
| 2,383,711 | Clark et al. | Aug. 28, 1945 |
| 2,530,923 | Turk et al. | Nov. 21, 1950 |

FOREIGN PATENTS

| Number | Country | Date |
|---|---|---|
| 13,297 | Great Britain | Sept. 14, 1916 |
| 625,330 | Great Britain | June 27, 1949 |